(12) United States Patent
Lu

(10) Patent No.: US 11,509,058 B2
(45) Date of Patent: Nov. 22, 2022

(54) ADJUSTABLE POLARIZATION CONVERTER AND ELECTRONIC DEVICE

(71) Applicant: Beijing BOE Technology Development Co., Ltd., Beijing (CN)

(72) Inventor: Yongchun Lu, Beijing (CN)

(73) Assignee: BEIJING BOE TECHNOLOGY DEVELOPMENT CO., LTD., Beijing (CN)

(*) Notice: Subject to any disclaimer, the term of this patent is extended or adjusted under 35 U.S.C. 154(b) by 522 days.

(21) Appl. No.: 16/496,646

(22) PCT Filed: Feb. 25, 2019

(86) PCT No.: PCT/CN2019/076071
§ 371 (c)(1),
(2) Date: Sep. 23, 2019

(87) PCT Pub. No.: WO2019/233128
PCT Pub. Date: Dec. 12, 2019

(65) Prior Publication Data
US 2020/0194899 A1 Jun. 18, 2020

(30) Foreign Application Priority Data
Jun. 8, 2018 (CN) .......................... 201810587958.3

(51) Int. Cl.
*H01Q 15/24* (2006.01)
*G02F 1/01* (2006.01)

(52) U.S. Cl.
CPC ......... *H01Q 15/244* (2013.01); *G02F 1/0136* (2013.01)

(58) Field of Classification Search
CPC .. H01P 1/165; H01P 1/17; H01P 1/171; H01P 1/172; H01P 1/173; H01P 1/174; H01P 1/175; H01Q 15/24; H01Q 15/242; H01Q 15/244; H01Q 15/246; H01Q 15/248; G01S 7/024; G01S 7/025; G01S 7/246;
(Continued)

(56) References Cited

U.S. PATENT DOCUMENTS

2005/0057701 A1 3/2005 Weiss

FOREIGN PATENT DOCUMENTS

| CN | 106773341 A | 5/2017 | |
| CN | 107394318 A * | 11/2017 | ............... H01P 1/18 |

(Continued)

*Primary Examiner* — Dameon E Levi
*Assistant Examiner* — Anh N Ho
(74) *Attorney, Agent, or Firm* — Dilworth & Barrese, LLP.; Michael J. Musella, Esq.

(57) ABSTRACT

An adjustable polarization converter and an electronic device are provided. The adjustable polarization converter includes a first substrate, a second substrate, and a liquid crystal layer between the first substrate and the second substrate. The first substrate includes a first base substrate and a first electrode on the first base substrate; the second substrate includes a second base substrate and a second electrode on the second base substrate. The first electrode includes a conductive frame and two triangular conductive patches. The conductive frame includes two openings disposed in sequence, and the two triangular conductive patches are disposed in a region surrounded by the conductive frame and are centrally symmetric.

19 Claims, 4 Drawing Sheets

(58) Field of Classification Search
CPC . G02F 1/1313; G02F 1/1343; G02F 1/134309
See application file for complete search history.

(56) References Cited

FOREIGN PATENT DOCUMENTS

| | | | | |
|---|---|---|---|---|
| CN | 107394318 A | | 11/2017 | |
| CN | 108039589 A | * | 5/2018 | ........... H01Q 15/244 |
| CN | 108649343 A | | 10/2018 | |
| CN | 207994077 U | * | 10/2018 | ................ H01P 1/18 |
| JP | 2004056549 A | | 2/2004 | |

* cited by examiner

ADJUSTABLE POLARIZATION CONVERTER AND ELECTRONIC DEVICE

CROSS REFERENCE TO RELATED APPLICATIONS

This application claims the benefit of priority of Chinese Patent Application No. 201810587958.3, filed on Jun. 8, 2018, the entire disclosure of which is incorporated herein by reference.

TECHNICAL FIELD

Embodiments of the present disclosure relate to an adjustable polarization converter and an electronic device.

BACKGROUND

The electromagnetic wave polarization converter is an important component in the antenna feed system, which is of important for improving the channel capacity and improving the signal-to-noise ratio of the wireless communication system. A role of the polarization converter is to change the polarization state of the incident electromagnetic wave to another polarization state, such as transforming a linearly polarized electromagnetic wave into a circularly polarized electromagnetic wave, or converting a circularly polarized electromagnetic wave into a linearly polarized electromagnetic wave.

At present, according to the different ways of input and output of electromagnetic signals, the polarization converter can be divided into a space feed polarization converter and a forced feed polarization converter. When the space feed polarization converter is in operation, the electromagnetic signal is output from the signal source, enters the phase shifter by space radiation, passes through the polarization converter (in the form of transmission or reflection), and then is output by space radiation, and is finally received by the microwave signal receiver.

SUMMARY

At least one embodiment provides an adjustable polarization converter, comprising: a first substrate comprising a first base substrate and a first electrode on the first base substrate; a second substrate comprising a second base substrate and a second electrode on the base substrate; and a liquid crystal layer between the first substrate and the second substrate. The first electrode comprises a conductive frame and two triangular conductive patches. The conductive frame comprises two openings disposed in sequence, and the two triangular conductive patches are disposed in a region surrounded by the conductive frame and are centrally symmetric.

For example, in the adjustable polarization converter provided by an embodiment of the present disclosure, each of the triangular conductive patches has a longest side parallel to a line connecting the two openings, and the two triangular conductive patches are centrally symmetric with respect to a first point on the line connecting the two openings.

For example, in the adjustable polarization converter provided by an embodiment of the present disclosure, the conductive frame is axisymmetric with respect to the line connecting the two openings, and the first point is located at a center of the region surrounded by the conductive frame.

For example, in the adjustable polarization converter provided by an embodiment of the present disclosure, the conductive frame has a circumference greater than 0.2 times a wavelength of a target electromagnetic wave in a dielectric layer and less than 1.5 times the wavelength of the target electromagnetic wave in the dielectric layer, and the dielectric layer comprises the first substrate, the liquid crystal layer, and the second substrate.

For example, in the adjustable polarization converter provided by an embodiment of the present disclosure, each of the triangular conductive patches is an inequilateral triangular conductive patch, and the longest side of each of the triangular conductive patches has a length less than 0.7 times the wavelength of the target electromagnetic wave in the dielectric layer, and a height of each of the triangular conductive patches perpendicular to the longest side has a length greater than 0.5 times the wavelength of the target electromagnetic wave in the dielectric layer, and the dielectric layer comprises the first substrate, the liquid crystal layer, and the second substrate.

For example, in the adjustable polarization converter provided by an embodiment of the present disclosure, the conductive frame is a rectangular ring in shape substantially.

For example, in the adjustable polarization converter provided by an embodiment of the present disclosure, the longest side of each of the triangular conductive patches is closer to the conductive frame than an apex angle of each of the triangular conductive patches, a distance between the longest side of each of the triangular conductive patches and the rectangular ring is less than or equal to a width of a frame of the conductive frame, and a distance between a vertex of each of the triangular conductive patches opposite to the longest side and the line connecting the two openings is greater than or equal to zero.

For example, in the adjustable polarization converter provided by an embodiment of the present disclosure, the distance between the vertex of each of the triangular conductive patches opposite to the longest side and the line connecting the two openings is greater than or equal to the width of the frame of the conductive frame.

For example, in the adjustable polarization converter provided by an embodiment of the present disclosure, the conductive frame and the triangular conductive patches have an orthographic projection on the first base substrate falling into an orthographic projection of the liquid crystal layer on the first base substrate.

For example, the adjustable polarization converter provided by an embodiment of the present disclosure further comprises wires electrically connected to the first electrode and configured to provide a driving voltage to the first electrode.

For example, in the adjustable polarization converter provided by an embodiment of the present disclosure, the wires are connected to the two triangular conductive patches and the conductive frame, respectively.

For example, in the adjustable polarization converter provided by an embodiment of the present disclosure, each of the wires has a width less than 10 microns.

For example, in the adjustable polarization converter provided by an embodiment of the present disclosure, the first electrode is on a side of the first base substrate near the liquid crystal layer, the second electrode is on a side of the second base substrate away from the liquid crystal layer, and the first electrode has an orthographic projection on the first base substrate falling within an orthographic projection of the second electrode on the first base substrate.

For example, in the adjustable polarization converter provided by an embodiment of the present disclosure, each opening has a shape of a rectangle, and the rectangle has sides perpendicular or parallel to the line connecting the two openings.

For example, the adjustable polarization converter provided by an embodiment of the present disclosure further comprises a driving voltage source coupled to the first electrode and configured to provide a driving voltage to the first electrode.

For example, the adjustable polarization converter provided by an embodiment of the present disclosure further comprises: a first alignment film; and a second alignment film. The first alignment film is disposed on a surface of the first substrate near the liquid crystal layer, and the second alignment film is disposed on a surface of the second substrate near the liquid crystal layer.

For example, in the adjustable polarization converter provided by an embodiment of the present disclosure, the liquid crystal layer has a thickness ranging from 0.01 mm to 0.25 mm.

For example, in the adjustable polarization converter provided by an embodiment of the present disclosure, the conductive frame has a frame width ranging from 0.05 mm to 0.25 mm.

For example, in the adjustable polarization converter provided by an embodiment of the present disclosure, the first electrode is a metal electrode and the second electrode is an ITO electrode.

At least one embodiment of the present disclosure provides an electronic device comprising any of the adjustable polarization converters.

BRIEF DESCRIPTION OF THE DRAWINGS

A brief description will be given below to the accompanying drawings of the embodiments to provide a more clear understanding of the technical proposals of the embodiments of the present disclosure. Apparently, the drawings described below only involve some embodiments of the present disclosure but are not intended to limit the present disclosure.

DETAILED DESCRIPTION

Figure 1:
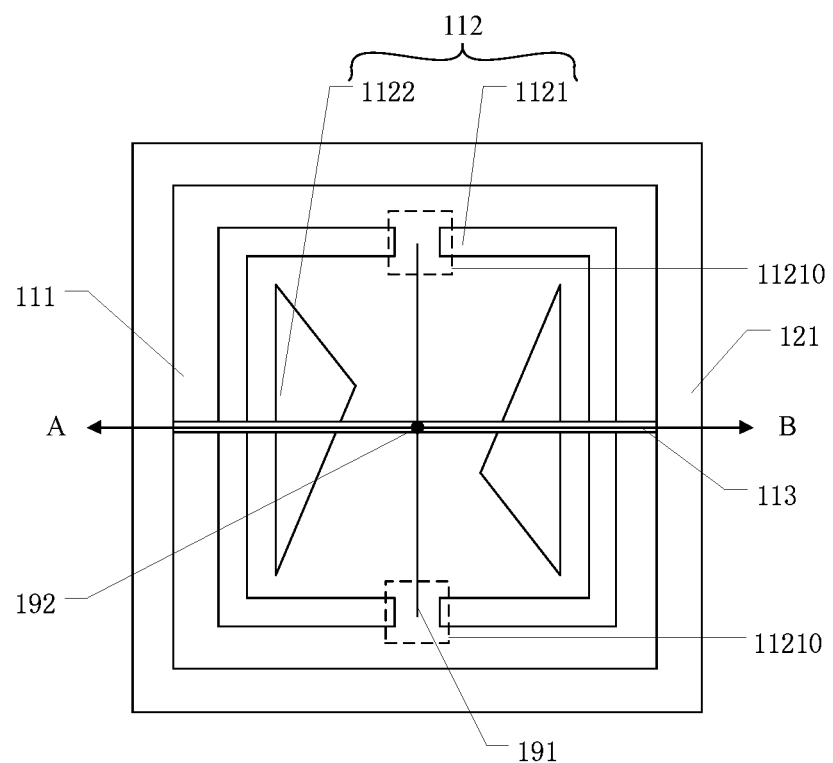
FIG. 1 is a schematic plan view of an adjustable polarization converter according to an embodiment of the present disclosure.

In order to make objects, technical details and advantages of the embodiments of the present disclosure apparent, the technical solutions of the embodiments will be described in a clearly and completely way in connection with the drawings related to the embodiments of the disclosure. Apparently, the described embodiments are just a part but not all of the embodiments of the disclosure. Based on the described embodiments herein, one of ordinary skill in the art can obtain other embodiment(s), without any creative labor, which shall be within the scope of the present disclosure.

Unless otherwise defined, all the technical and scientific terms used herein have the same meanings as commonly understood by one of ordinary skill in the art to which the present disclosure belongs. The terms, such as 'first,' 'second,' or the like, which are used in the description and the claims of the present disclosure, are not intended to indicate any sequence, amount or importance, but for distinguishing various components. The terms, such as 'comprise/comprising,' 'include/including,' or the like are intended to specify that the elements or the objects stated before these terms encompass the elements or the objects and equivalents thereof listed after these terms, but not preclude other elements or objects. The terms, such as "connect/connecting/connected," "couple/coupling/coupled" or the like, are not limited to a physical connection or mechanical connection, but may include an electrical connection/coupling, directly or indirectly.

In the study, the inventors of the present application have noticed that the conventional electromagnetic wave polarization converter is not adjustable, and once installed, its polarization torsional characteristics are fixed. However, with the increasing integration of wireless communication systems, it is desirable that the characteristics of the polarization converter can be easily adjusted after its installation, thereby achieving the capability of multi-purpose. In addition, the existing space feed adjustable polarization converter is mainly implemented by loading a varactor diode or a switching diode, but due to the effect of the parasitic parameters of the package, both the varactor diode and the switching diode can only operate at a relatively low frequency (generally lower than 10 GHz). Therefore, the adjustable polarization converter implemented by the diode has a problem of low operating frequency, which undoubtedly greatly limits the application scenario of the polarization converter.

Embodiments of the present disclosure provide an adjustable polarization converter and an electronic device. The adjustable polarization converter includes a first substrate, a second substrate, and a liquid crystal layer disposed between the first substrate and the second substrate. The first substrate includes a first base substrate and a first electrode disposed on the first base substrate; the second substrate includes a second base substrate and a second electrode disposed on the second base substrate. The first electrode includes a conductive frame and two triangular conductive patches, and the conductive frame includes two openings arranged in sequence, and the two triangular conductive patches are disposed in a region surrounded by the conductive frame and are centrally symmetric. Through the adjustable liquid crystal with strong anisotropy and the composite resonant structure, the adjustable polarization converter can realize polarization conversion of incident electromagnetic waves at a higher frequency, and solves the problem that the conventional space feed adjustable polarization converter has a low operating frequency. In addition, the adjustable polarization converter has the following advantages: firstly, the structure is simple and easy to process with high precision; secondly, because the composite resonant structure is adopted, an adjustable polarization conversion can be realized only by a very thin liquid crystal layer, and a fast response speed can be obtained; thirdly, because the liquid crystal material is adopted as the adjustment medium, it has the advantages of high operating frequency and large operating frequency range.

The adjustable polarization converter and the electronic device provided by the embodiments of the present disclosure are described in detail below with reference to the accompanying drawings.

Figure 2:
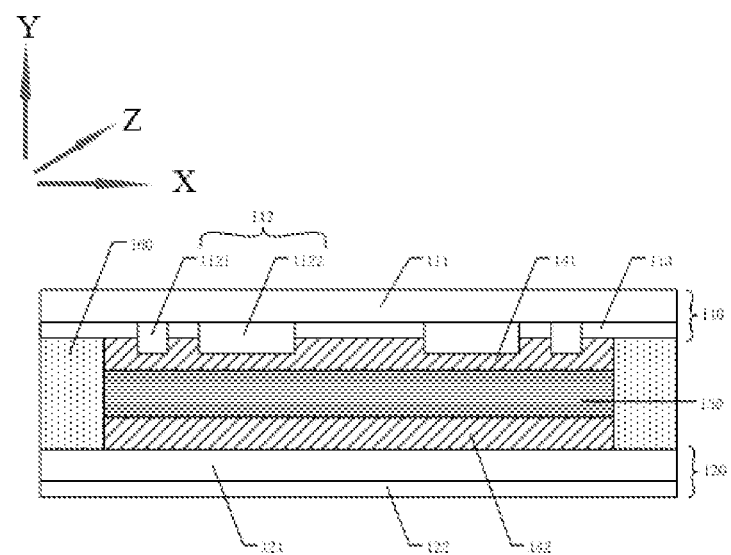
FIG. 2 is a schematic cross-section view of the adjustable polarization converter taken along line AB in FIG. 1 according to an embodiment of the present disclosure.
Figure 3:
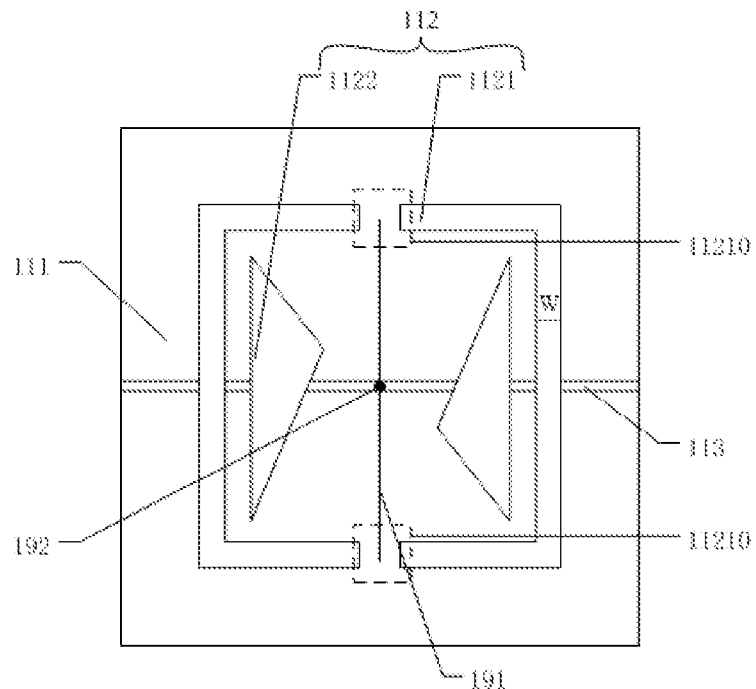
FIG. 3 is a schematic plan view of a first substrate in an adjustable polarization converter according to an embodiment of the present disclosure.

At least one embodiment of the present disclosure provides an adjustable polarization converter. FIG. 1 is a schematic plan view of an adjustable polarization converter according to an embodiment of the present disclosure. FIG. 2 is a schematic cross-section view of the adjustable polarization converter taken along line AB of FIG. 1 according to an embodiment of the present disclosure. FIG. 3 is a schematic plan view of a first substrate in an adjustable polarization converter according to an embodiment of the present disclosure.

As shown in FIGS. 1-3, the adjustable polarization converter includes a first substrate 110, a second substrate 120, and a liquid crystal layer 130 disposed between the first substrate 110 and the second substrate 120. The first substrate 110 includes a first base substrate 111 and a first electrode 112 disposed on the first base substrate 111; the second substrate 120 includes a second base substrate 121 and a second electrode 122 disposed on the second base substrate 121. The first electrode 112 includes a conductive frame 1121 and two triangular conductive patches 1122. The conductive frame 1121 includes two openings 11210 arranged in sequence. The line connecting the two openings 11210 is the first straight line 191, and the two triangular conductive patches 1122 are disposed in a region surrounded by the conductive frame 1121 and are centrally symmetric. It is to be noted that the area of the first base substrate 111 of FIG. 1 is smaller than that of the second base substrate 121 in order to more clearly show the structure of the adjustable polarization converter, and the area of the first base substrate 111 may be equal to the area of the second base substrate 121. In addition, in order to clearly and succinctly describe the structure of the adjustable polarization converter, the first straight line 191 hereinafter represents the line connecting the two openings 11210, that is, the first straight line 191 is not a solid structure, and is merely a virtual straight line for clearly describing the structure of the adjustable polarization converter.

In the adjustable polarization converter provided by this embodiment, the conductive frame 1121 and the two triangular conductive patches 1122 can form a composite resonant structure. In the composite resonant structure, the conductive frame 1121 and the two triangular conductive patches 1122 respectively resonate, and there is electromagnetic coupling between the conductive frame 1121 and the triangular conductive patch 1122, generating a strong dispersion effect. The composite resonant structure can cooperate with the liquid crystal material in the liquid crystal layer 130, and realizes a technical effect of polarization-converting incident electromagnetic waves (target electromagnetic waves) by using a very thin liquid crystal layer. It is to be noted that the above-mentioned target electromagnetic wave refers to an electromagnetic wave incident when the adjustable polarization converter operates.

For example, as shown in FIG. 1-3, the three directions of X, Y, and Z shown in FIG. 1-3 are three directions perpendicular to each other in a Cartesian coordinate system, where the X and Z directions are parallel to the direction of the first substrate 110, and the Y direction is perpendicular to the direction of the first substrate 110, as shown in FIG. 2. The adjustable polarization converter can form an electric field between the first electrode 112 and the second electrode 122 by applying a voltage to drive the liquid crystal molecules in the liquid crystal layer 130 to deflect. In this way, the liquid crystal characteristics of the liquid crystal material in the liquid crystal layer 130 (for example, the dielectric constant of the liquid crystal material in the liquid crystal layer 130) is changed. When a linearly polarized electromagnetic wave having a polarization direction in the XOZ plane and at 45 degrees from the X axis is incident on the adjustable polarization converter from a direction perpendicular to the first substrate 110 (i.e., parallel to the Y direction), the linearly polarized electromagnetic wave can be decomposed into a linearly polarized electromagnetic wave along the X direction and a linearly polarized electromagnetic wave along the Z direction. For the linearly polarized electromagnetic wave along the Z direction described above, the linearly polarized electromagnetic wave subjected to the effect of the adjustable polarization converter can maintain the same phase state before and after the change of liquid crystal characteristics. For the linearly polarized electromagnetic wave along the X direction, the linearly polarized electromagnetic wave subjected to the effect of the adjustable polarization converter can generate a phase change of about 90 degrees before and after the change of the liquid crystal characteristic. At this time, the linearly polarized electromagnetic wave along the X direction and the linearly polarized electromagnetic wave along the Z direction which are subjected to the effect of the adjustable polarization converter may form circularly polarized electromagnetic waves. In this way, after the linearly polarized electromagnetic wave having a polarization direction in the XOZ plane and at 45 degrees from the X axis is output from the adjustable polarization converter, the polarization state thereof will be converted between the linearly polarized wave and the circularly polarized wave with the change of the liquid crystal characteristics of the liquid crystal material in the liquid crystal layer 130. In this way, the adjustable polarization converter can realize polarization conversion of the incident electromagnetic wave at a higher frequency through the adjustable liquid crystal having strong anisotropy and the above-mentioned composite resonance structure, solving the problem that the common space feed adjustable polarization converter has a low operating frequency. It is to be noted that the above three directions of X, Y, and Z may be any direction perpendicular to each other in the ground reference coordinate system, for example, where the x direction is a direction perpendicular to the ground, however, embodiments of the present disclosure are not limited thereto, and the coordinate system may be transformed as needed.

In addition, first, since the structure of the adjustable polarization converter is simple, it is easy to process with high precision; for example, the first electrode can be may be patterned (e.g., a process such as exposure, development, etching, etc.) by using a semiconductor preparation apparatus and process (e.g., a preparation apparatus and process for a liquid crystal display panel), so that it can have high precision. Second, since the adjustable polarization converter adopts the above-mentioned composite resonant structure, only a very thin liquid crystal layer is required to realize an adjustable polarization conversion, so that it has the characteristics of being thin and light, and also has a fast response speed, thus having a wide range of applications. Third, since the adjustable converter adopts a liquid crystal material as an adjustment medium, it has the advantages of high operating frequency and broader operating frequency range.

For example, in some examples, as shown in FIGS. 1-3, the material of the first electrode 112 may be a metal material; the material of the second electrode 122 may be a conductive reflective material including a metal material, such as copper (Cu), aluminum (Al), gold (Au), silver (Ag), or alloys thereof, and the material of the second electrode 122 may also be a conductive transmissive material, such as indium tin oxide (ITO). When the material of the second electrode 122 is a conductive reflective material, the adjustable polarization converter is of a reflective type, the electromagnetic wave enters the adjustable polarization converter by the space radiation from the side where the first electrode is located, and then is reflected by the second electrode, and then is output by the space radiation. When the material of the second electrode 122 is a conductive transmissive material, the adjustable polarization converter is of a transmissive type, and the electromagnetic wave enters the adjustable polarization converter by the space radiation from a side of the adjustable polarization converter where one of the first electrode and the second electrode is located, and then pass through the other one of the first electrode and the second electrode, and then is output by the space radiation.

For example, in some examples, the first base substrate 111 and the second base substrate 121 are oppositely disposed to act as a support, protection, insulater, etc., and may further be used to avoid leakage of electromagnetic waves to reduce radiation loss of the adjustable polarization converter. For example, the first base substrate 111 and the second base substrate 121 may be printed circuit boards (PCBs), so the adjustable polarization converter can be processed by a PCB process, which can reduce production costs. For example, the printed circuit board may use a plastic substrate, a ceramic substrate, or the like. For example, the first base substrate 111 and the second base substrate 121 may be Rogers high-frequency plates made of polytetrafluoroethylene (PTFE). Embodiments of the present disclosure are not limited thereto, and the first base substrate 111 and the second base substrate 121 may be of any suitable material.

For example, in some examples, the liquid crystal layer 130 adopts a single liquid crystal material having a large anisotropy, such as a nematic liquid crystal, or the like, and may adopts a mixed liquid crystal material (mixed crystal) as long as it can serve as a control medium, and the embodiment of the present disclosure does not limit it. The thickness of the liquid crystal layer 130 (i.e., the cell thickness of the liquid crystal cell formed by the first substrate 110 and the second substrate 120) may be determined according to actual needs.

For example, in some examples, the thickness of the liquid crystal layer ranges from 0.01 mm to 0.25 mm.

For example, in some examples, as shown in FIGS. 1 and 3, the triangular conductive patch 1122 is an inequilateral triangular conductive patch, and the longest side of each triangular conductive patch 1122 is parallel to the first straight line 191, and the two triangular conductive patches 1122 are centrally symmetric with respect to the first point 192, and the first point 192 is located on the first straight line 191. In this way, the electromagnetic coupling effect between the conductive frame 1121 and the triangular conductive patches 1122 can be improved.

For example, in some examples, as shown in FIGS. 1 and 3, the longest side of the triangular conductive patch 1122 is closer to the conductive frame 1121 relative to the apex angle of the triangular conductive patch 1122. It is to be noted that the above apex angle is the angle of the triangular conductive patch opposite to the longest side.

For example, in some examples, as shown in FIGS. 1 and 3, the conductive frame 1121 is axisymmetric with respect to the first straight line 191, and the first point 192 is located at the center of the area surrounded by the conductive frame 1121. In this way, on the one hand, the resonance effect of the conductive frame 1121 and the two triangular conductive patches 1122 can be improved, and the electromagnetic coupling effect between the conductive frame 1121 and the triangular conductive patch 1122 can also be improved. In addition, the symmetry between the conductive frame and the triangular conductive patch can be improved, the positional accuracy can be improved, and the manufacturing process can be simplified.

For example, in some examples, the circumference of the conductive frame is greater than 0.2 times the wavelength of the target electromagnetic wave in the dielectric layer and less than 1.5 times the wavelength of the target electromagnetic wave in the dielectric layer. At this time, the effect of the adjustable polarization converter is better. It is to be noted that the dielectric layer includes a first substrate, a liquid crystal layer, and a second substrate. The above-mentioned wavelength of the electromagnetic wave in the dielectric layer represents that the electromagnetic wave has a uniform value under the constraints of Maxwell's equation and boundary conditions in the dielectric layer (for example, the first substrate, the liquid crystal layer, and the second substrate). At this time, after the simulation, the effect of the adjustable polarization converter is better.

For example, in some examples, the length of the longest side of each triangular conductive patch is less than 0.7 times the wavelength of the target electromagnetic wave in the dielectric layer, and the length of the height of each triangular conductive patch perpendicular to the longest side is greater than 0.5 times the wavelength of the target electromagnetic wave in the dielectric layer. The dielectric layer includes a first substrate, a liquid crystal layer, and a second substrate. At this time, after the simulation, the effect of the adjustable polarization converter is better.

For example, in some examples, as shown in FIGS. 1 and 3, the conductive frame 1121 is a rectangular ring in shape generally has a width W as shown in FIG. 3. The embodiments of the present disclosure include but are not limited thereto, and the conductive frame 1121 may also be other polygonal rings, or circle rings.

For example, in some examples, when the conductive frame is a rectangular ring, the longest side of the triangular conductive patch 1122 is closer to the conductive frame 1121 than the apex angle of the triangular conductive patch 1122, and the distance between the longest side of each triangular conductive patch and the conductive frame is less than or equal to the width W of the frame of the conductive frame; the distance between the vertex of each triangular conductive patch opposite to the longest side and the first straight line is greater than or equal to zero. At this time, the effect of the adjustable polarization converter is better.

For example, in some examples, the distance between the vertex of each triangular conductive patch opposite to the longest side and the first straight line is greater than or equal to the width of the frame of the conductive frame. At this time, after the simulation, the effect of the adjustable polarization converter is better.

For example, in some examples, the width of the frame of the conductive frame ranges from 0.05 mm to 0.25 mm.

For example, in some examples, as shown in FIGS. 1 and 3, the shape of the opening 11210 includes a rectangle, and the sides of the rectangle are perpendicular or parallel to the first straight line 191. In this way, on the one hand, the resonance effect of the conductive frame 1121 alone can be improved, and the electromagnetic coupling effect between the conductive frame 1121 and the triangular conductive patch 1122 can also be improved.

For example, in some examples, as shown in FIGS. 1 and 3, the adjustable polarization converter further includes a wire 113 electrically connected to the first electrode 112 and used to supply power to the first electrode 112. For example, the wire 113 may be made of copper, aluminum, gold, silver, or an alloy thereof, or may be made of other suitable metal materials.

For example, in some examples, as shown in FIGS. 1 and 3, the wire 113 is perpendicular to the first straight line 191 and is connected to the two triangular conductive patches 1122 and the conductive frame 1121, respectively.

For example, in some examples, as shown in FIGS. 1 and 3, the width of the wires is less than 10 microns, which can reduce the interference of the wire(s) with electromagnetic waves.

For example, in some examples, as shown in FIGS. 1 and 3, the orthographic projection of the first electrode 112 on the first base substrate 111 is within the orthographic projection of the second electrode 122 on the first base substrate 111. This permits the liquid crystal material located between the first electrode 112 and the second electrode 122 to be deflected by the electric field between the first electrode 112 and the second electrode 122. In addition, when the second electrode 122 is made of a conductive reflective material, it is permitted that the incident electromagnetic wave will be totally reflected by the second electrode 122 to reduce the loss.

For example, the second electrode 122 may completely cover the second base substrate 121, that is, the orthographic projection of the second electrode 122 on the second base substrate 121 covers the entire second substrate 121, saving the patterning process of the second electrode 122 and reducing the cost. The embodiment of the present disclosure includes but is not limited thereto, and the second electrode 122 may partially cover the second base substrate 120, which may be determined according to actual needs, and only needs to permit that the orthographic projection of the first electrode 112 on the first base substrate 111 is within the orthographic projection of the second electrode 122 on the first base substrate 111. The orthographic projection of the wire 113 on the first base substrate 111 may also be located within the orthographic projection of the second electrode 122 on the first base substrate 111.

For example, in some examples, as shown in FIGS. 1 and 3, the orthographic projection of the conductive frame 1121 and the triangular conductive patches 1122 on the first substrate 111 falls onto the orthographic projection of the liquid crystal layer 130 on the first base substrate 111. In this way, the synergistic effect between the liquid crystal material of the liquid crystal layer 130 and the composite resonant structure formed by the conductive frame 1121 and the triangular conductive patches 1122 can be allowed.

For example, in some examples, as shown in FIG. 2, the first electrode 112 is disposed on a side of the first base substrate 111 near the liquid crystal layer 130, however, the embodiments of the present disclosure include but are not limited thereto, and the first electrode 112 may also be disposed on a side of the first base substrate 111 away from the liquid crystal layer 130.

For example, in some examples, as shown in FIG. 2, the second electrode 122 is disposed on a side of the second base substrate 121 away from the liquid crystal layer 130; however, the embodiments of the present disclosure include but are not limited thereto, and the second electrode may also be disposed on a side of the second base substrate 121 near the liquid crystal layer 130.

For example, in some examples, as shown in FIG. 2, the adjustable polarization converter further includes a first alignment film 141 and a second alignment film 142. The first alignment film 141 is disposed on a surface of the first substrate 110 near the liquid crystal layer 130, and the second alignment film 142 is disposed on a surface of the second substrate 120 near the liquid crystal layer 130. The first alignment film and the second alignment film are configured to align the liquid crystal molecules in the liquid crystal layer such that the liquid crystal molecules in the liquid crystal layer 130 have a given initial deflection angle, to facilitate the deflection of the liquid crystal molecules driven by the driving voltages of the wires 113 and the common electrode, increasing the corresponding speed.

For example, the first alignment film 141 and the second alignment film 142 may be formed by an organic material, such as polyimide (PI), and may be processed by friction, illumination, or the like, to obtain alignment characteristics. However, embodiments of the present disclosure are not limited thereto, and other components or devices may be employed to control the preset deflection direction of the liquid crystal molecules. For example, in other examples, the preset deflection direction of the liquid crystal molecules is controlled by a separately provided alignment electrode and a bias voltage source, so, the first alignment layer and the second alignment layer may be omitted.

For example, in an example, as shown in FIG. 2, the adjustable polarization converter further includes a package structure 160. The package structure 160 is disposed between the first substrate 110 and the second substrate 120 and surrounds the liquid crystal layer 130. The package structure 160 can use, for example, a sealant to prevent leakage of liquid crystal, and functions to support the structure of the liquid crystal cell, strengthen the thickness of the cell, and the like. The main component of the sealant is/are resin(s), and may further include an additive, such as a heat curing monomer, or the like, as needed. However, embodiments of the present disclosure are not limited thereto, and other suitable manners may be employed to prevent liquid crystal from leaking and supporting the liquid crystal cell structure.

Figure 4:
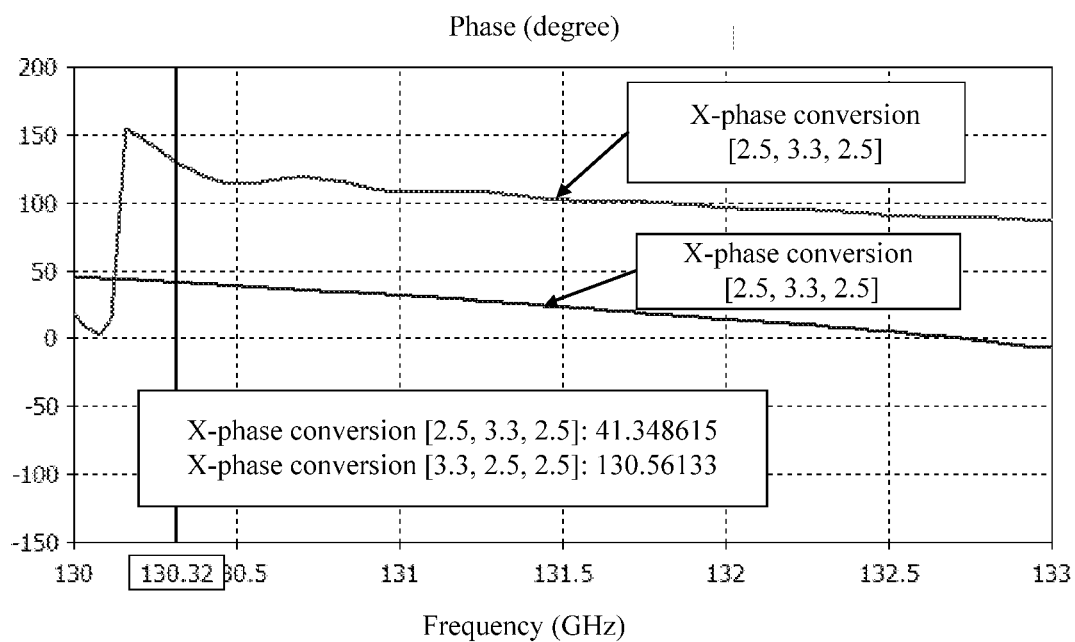
FIG. 4 and FIG. 5 are numerical value simulation result diagram of a simulation model of an adjustable polarization converter according to an embodiment of the present disclosure.
Figure 5:
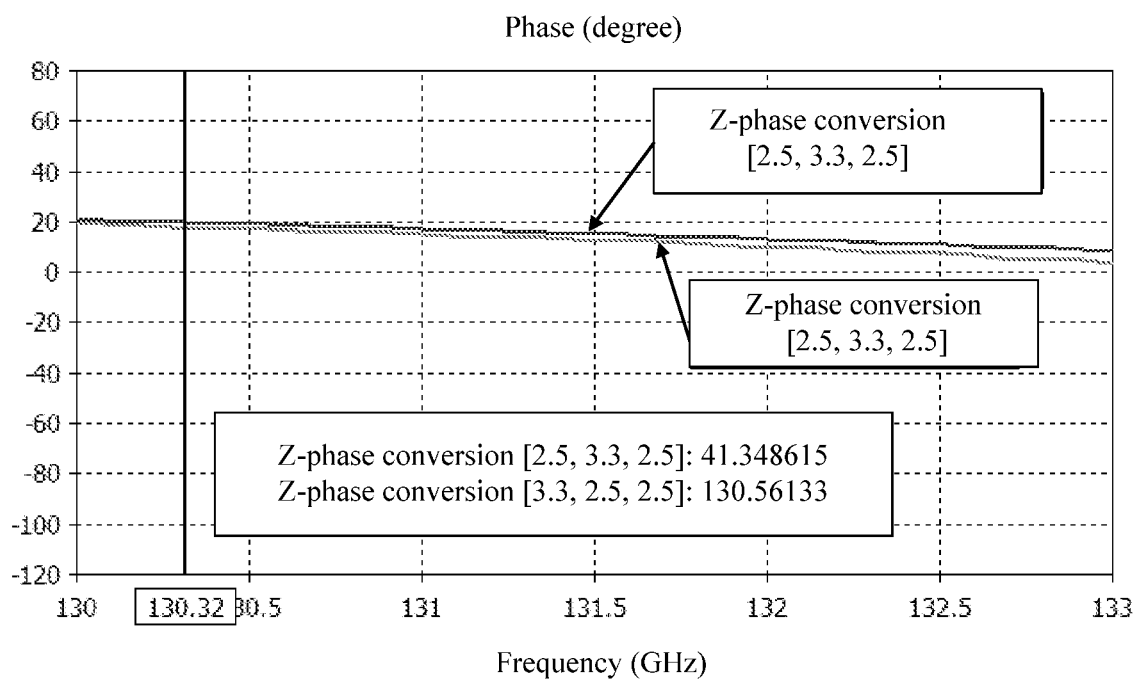

FIG. 4 and FIG. 5 are numerical value simulation result diagrams of a simulation model of an adjustable polarization variator according to an embodiment of the present disclosure. FIG. 4 shows the phase change of the linearly polarized wave in the X direction by the adjustable polarization converter; FIG. 5 shows the phase change of the linearly polarized wave in the Z direction by the adjustable polarization converter. In the simulation model, the width of the conductive frame is 0.1 mm, the length of the outer boundary of the conductive frame in the X direction and the Z direction is 1.2 mm; the width of the opening is 0.14 mm; the length of the side of each triangular conductive patch in the X direction (the longest side) is 0.8 mm, the other two sides of each triangular conductive patch are 0.28 mm and 0.63 mm, respectively; the distance between each triangular conductive patch and the conductive frame in the Z direction is 0.09 mm; the thickness of the liquid crystal layer is 0.1 mm; both the first base substrate and the second base substrate have a dielectric constant of 3.8, both the first base substrate and the second base substrate have a thickness of 0.3 mm; and the second electrode is made of ITO and has a thickness of 70 nm.

As described above, the electric field formed between the first electrode 112 and the second electrode 122 can drive the liquid crystal molecules in the liquid crystal layer 130 to deflect, to change the liquid crystal characteristics of the liquid crystal material in the liquid crystal layer 130 (for example, the dielectric constant of the liquid crystal material in the liquid crystal layer 130). As shown in FIGS. 4 and 5, after an electric field is formed between the first electrode 112 and the second electrode 122, the liquid crystal molecules in the liquid crystal layer are directed from a horizontal direction (for example, the X direction) to a vertical direction perpendicular to the horizontal direction (Y direction). At this time, the dielectric constants of the liquid crystal material of the liquid crystal layer in the three directions of X, Y, and Z changes from [3.3, 2.5, 2.5] to [2.5, 3.3, 2.5].

In this case, when a linearly polarized electromagnetic wave having a polarization direction in the XOZ plane and at 45 degrees from the X axis is incident from the direction perpendicular to the first substrate 110 (i.e., parallel to the Y direction) to the adjustable polarization converter, the linearly polarized electromagnetic wave can be decomposed into a linearly polarized electromagnetic wave in the X direction and a linearly polarized electromagnetic wave in the Z direction. As shown in FIG. 4, for the above-mentioned linearly polarized electromagnetic wave in the X direction, when the frequency of the electromagnetic wave is 130.32 GHz, and when the liquid crystal molecules are horizontally oriented (i.e., the dielectric constants of the liquid crystal material of the liquid crystal layer in the three directions of X, Y, and Z are [3.3, 2.5, 2.5]), the phase of the electromagnetic wave output by the adjustable polarization converter is 130.56 degrees; after the liquid crystal molecules become vertically oriented (i.e., the dielectric constants of the liquid crystal material of the liquid crystal layer in the three directions of X, Y, and Z are [2.5, 3.3, 2.5]), the phase of the electromagnetic wave output by the adjustable polarization converter is 41.35 degrees. It can be seen that the phase of the electromagnetic wave output by the adjustable polarization converter changes by about 90 degrees when the liquid crystal molecules are directed from the horizontal direction to the vertical direction. As shown in FIG. 5, for the above-mentioned linearly polarized electromagnetic wave in the Z direction, when the frequency of the electromagnetic wave is 130.32 GHz, and when the liquid crystal molecules are horizontally oriented (i.e., the dielectric constants of the liquid crystal material of the liquid crystal layer in the three directions of X, Y, and Z are [3.3, 2.5, 2.5]), the phase of the electromagnetic wave output by the adjustable polarization converter is 17.49 degrees; after the liquid crystal molecules become vertically oriented (i.e., the dielectric constants of the liquid crystal material of the liquid crystal layer in the three directions of X, Y, and Z are [2.5, 3.3, 2.5]), the phase of the electromagnetic wave output by the adjustable polarization converter is 19.69 degrees. It can be seen that the phase of the electromagnetic wave output by the adjustable polarization converter maintains the same phase state when the liquid crystal molecules are directed from the horizontal direction to the vertical direction. At this time, the linearly polarized electromagnetic wave in the X direction and the linearly polarized electromagnetic wave in the Z direction modulated by the adjustable polarization converter can form circularly polarized electromagnetic waves. In this way, after the linearly polarized electromagnetic wave having a polarization direction in the XOZ plane and at 45 degrees from the X-axis is output from the adjustable polarization converter, the polarization state thereof will be converted between the linearly polarized wave and the circularly polarized wave as the liquid crystal characteristics of the liquid crystal material in the liquid crystal layer 130 change, that is, when a voltage is applied to the first electrode and the second electrode to form an electric field, the adjustable polarization converter converts linearly polarized electromagnetic waves having a polarization direction in the XOZ plane and at 45 degrees from the X axis into circularly polarized electromagnetic waves, and when no voltage is applied to the first electrode and the second electrode, the linearly polarized electromagnetic wave having a polarization direction in the XOZ plane and at 45 degrees from the X axis is still a linearly polarized electromagnetic wave after passing through the adjustable polarization converter.

It is to be noted that in the above simulation model, the dielectric constant of the liquid crystal molecules directly under the metal frame and the triangular conductive patches is set to change under the driving voltage, and the dielectric constant of the liquid crystal molecules in other regions remains unchanged. However, in practice, the dielectric constant of the liquid crystal molecules around the metal frame and the triangular conductive patches may also change under the driving voltage, so this numerical value simulation method is actually the most conservative calculation of the performance of the adjustable polarization converter according to an embodiment of the present disclosure, that is, the actual adjustment range of the adjustable polarization converter according to an embodiment of the present disclosure is better than the numerical value simulation results described above.

Figure 6:
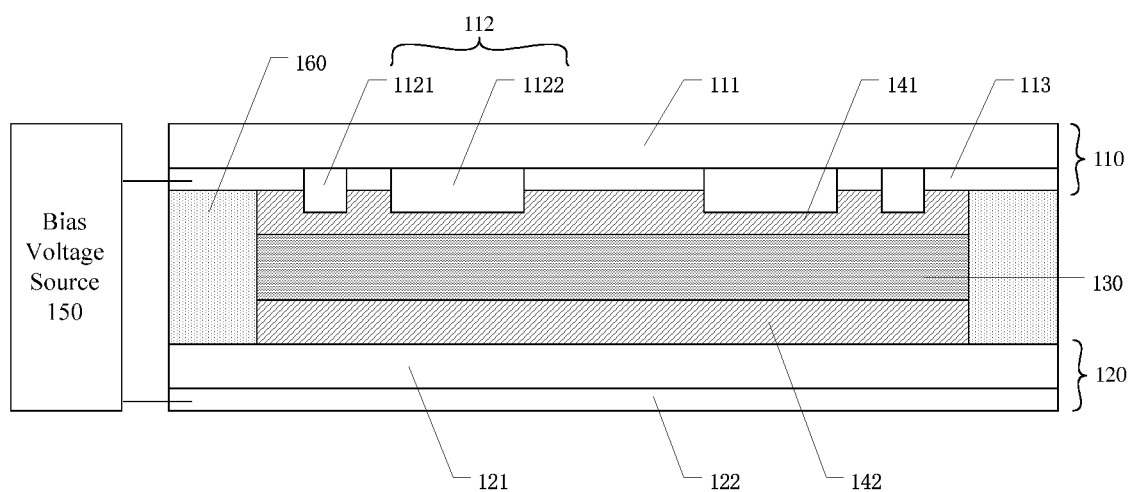
FIG. 6 is a schematic diagram of an adjustable polarization converter according to an embodiment of the present disclosure.

FIG. 6 is a schematic diagram of an adjustable polarization converter according to an embodiment of the present disclosure. As shown in FIG. 6, the adjustable polarization converter further includes a driving voltage source 150 connected to the first electrode 112 and configured to provide a driving voltage to the first electrode 112. It is to be noted that FIG. 6 is illustrated in which the driving voltage source 150 is a bias voltage source as an example.

For example, the bias voltage source 150 may be a direct current power source; or, the driving voltage source 150 can be a bias voltage source. The driving voltage source 150 is a voltage output terminal of a control chip (not shown), and may change the magnitude of the output voltage or the like according to the control signal.

For example, the second electrode may be as a ground layer and connected to a separately provided signal ground to form an electric field that drives the deflection of the liquid crystal molecules in the liquid crystal layer 130 together with the first electrode.

At least one embodiment of the present disclosure also provides an electronic device. The electronic device includes the adjustable polarization converter described in any one of the above. So, the electronic device has technical effects corresponding to the advantageous effects of the above-described adjustable polarization converter. For example, the electronic device can realize polarization conversion of incident electromagnetic waves at a higher frequency by an adjustable liquid crystal having strong anisotropy and a composite resonant structure, solving the problem that the common space feed adjustable polarization converter has a low operating frequency.

Figure 7:
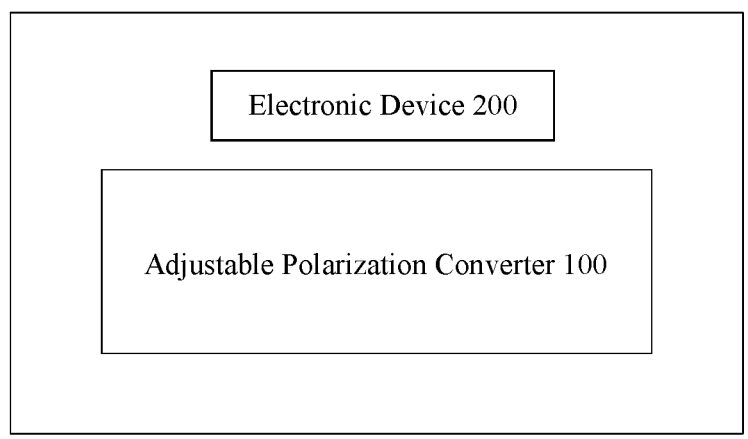
FIG. 7 is a schematic block diagram of an electronic device according to an embodiment of the present disclosure.

FIG. 7 is a schematic block diagram of an electronic device according to an embodiment of the present disclosure. As shown in FIG. 7, electronic device 200 includes an adjustable polarization converter 100. The adjustable polarization converter 100 is an adjustable polarization converter provided by any of the above examples.

For example, the electronic device may be any device including an adjustable polarization converter, such as an electronically controlled scanning antenna, a radar system, an accelerator, a communication base station, a power splitter, etc., which is not limited by the embodiments of the present disclosure. The electronic device may also include more components, and the connection relationship between the various components and the adjustable polarization converter is not limited.

The following points should be noted:

(1) The accompanying drawings involve only the structure(s) in connection with the embodiment(s) of the present disclosure, and other structure(s) can be referred to common design(s).

(2) Without conflicting with each other, features in one embodiment or in different embodiments can be combined.

The above description is only the specific implementations of the present disclosure, and the scope of the present disclosure is not limited thereto. Those skilled in the art can easily contemplate changes and replacements within the technical scope of the disclosure, and such changes and replacements shall fall into the scope of the present disclosure. The scope of the present disclosure should be defined by the scope of the claims.

What is claimed is:

1. An adjustable polarization converter, comprising:
    a first substrate comprising a first base substrate and a first electrode on the first base substrate;
    a second substrate comprising a second base substrate and a second electrode on the second base substrate; and
    a liquid crystal layer between the first substrate and the second substrate,
    wherein the first electrode comprises a conductive frame and two triangular conductive patches, the conductive frame comprises two openings disposed in sequence, and the two triangular conductive patches are disposed in a region surrounded by the conductive frame and are centrally symmetric,
    wherein each of the triangular conductive patches has a longest side parallel to a line connecting the two openings, the two triangular conductive patches are centrally symmetric with respect to a first point on the line connecting the two openings.

2. The adjustable polarization converter according to claim 1, wherein the conductive frame is axisymmetric with respect to the line connecting the two openings, and the first point is located at a center of the region surrounded by the conductive frame.

3. The adjustable polarization converter according to claim 2, wherein the conductive frame has a circumference greater than 0.2 times a wavelength of a target electromagnetic wave in a dielectric layer and less than 1.5 times the wavelength of the target electromagnetic wave in the dielectric layer, and the dielectric layer comprises the first substrate, the liquid crystal layer, and the second substrate.

4. The adjustable polarization converter according to claim 3, wherein each of the triangular conductive patches is an inequilateral triangular conductive patch, and the longest side of each of the triangular conductive patches has a length less than 0.7 times the wavelength of the target electromagnetic wave in the dielectric layer, and a height of each of the triangular conductive patches perpendicular to the longest side has a length greater than 0.5 times the wavelength of the target electromagnetic wave in the dielectric layer, and the dielectric layer comprises the first substrate, the liquid crystal layer, and the second substrate.

5. The adjustable polarization converter according to claim 4, wherein the conductive frame is a rectangular ring in shape substantially.

6. The adjustable polarization converter according to claim 5, wherein the longest side of each of the triangular conductive patches is closer to the conductive frame than an apex angle of each of the triangular conductive patches, a distance between the longest side of each of the triangular conductive patches and the rectangular ring is less than or equal to a width of a frame of the conductive frame, and a distance between a vertex of each of the triangular conductive patches opposite to the longest side and the line connecting the two openings is greater than or equal to zero.

7. The adjustable polarization converter according to claim 5, wherein a distance between a vertex of each of the triangular conductive patches opposite to the longest side and the line connecting the two openings is greater than or equal to a width of a frame of the conductive frame.

8. The adjustable polarization converter according to claim 7, wherein the conductive frame and the triangular conductive patches have an orthographic projection on the first base substrate falling into an orthographic projection of the liquid crystal layer on the first base substrate.

9. The adjustable polarization converter according to claim 8, further comprising:
    wires electrically connected to the first electrode and configured to provide a driving voltage to the first electrode.

10. The adjustable polarization converter according to claim 9, wherein the wires are connected to the two triangular conductive patches and the conductive frame, respectively.

11. The adjustable polarization converter according to claim 9, wherein each of the wires has a width less than 10 microns.

12. The adjustable polarization converter according to claim 11, wherein the first electrode is on a side of the first base substrate near the liquid crystal layer, the second electrode is on a side of the second base substrate away from the liquid crystal layer, and the first electrode has an orthographic projection on the first base substrate falling within an orthographic projection of the second electrode on the first base substrate.

13. The adjustable polarization converter according to claim 12, wherein each opening has a shape of a rectangle, and the rectangle has sides perpendicular or parallel to the line connecting the two openings.

14. The adjustable polarization converter according to claim 13, further comprising:
    a driving voltage source connected to the first electrode and configured to provide a driving voltage to the first electrode.

15. The adjustable polarization converter according to claim 14, further comprising:
    a first alignment film; and
    a second alignment film;
    wherein the first alignment film is disposed on a surface of the first substrate near the liquid crystal layer, and the second alignment film is disposed on a surface of the second substrate near the liquid crystal layer.

16. The adjustable polarization converter according to claim 15, wherein the liquid crystal layer has a thickness ranging from 0.01 mm to 0.25 mm.

17. The adjustable polarization converter according to claim 16, wherein the conductive frame has a frame width ranging from 0.05 mm to 0.25 mm.

18. The adjustable polarization converter according to claim 17, wherein the first electrode is a metal electrode and the second electrode is an ITO electrode.

19. An electronic device comprising an adjustable polarization converter, wherein the adjustable polarization converter comprises:
- a first substrate comprising a first base substrate and a first electrode on the first base substrate;
- a second substrate comprising a second base substrate and a second electrode on the second base substrate; and
- a liquid crystal layer between the first substrate and the second substrate,
- wherein the first electrode comprises a conductive frame and two triangular conductive patches, the conductive frame comprises two openings disposed in sequence, and the two triangular conductive patches are disposed in a region surrounded by the conductive frame and are centrally symmetric,
- wherein each of the triangular conductive patches has a longest side parallel to a line connecting the two openings, the two triangular conductive patches are centrally symmetric with respect to a first point on the line connecting the two openings.

* * * * *